(12) United States Patent  
Maruta et al.

(10) Patent No.: US 7,161,712 B2  
(45) Date of Patent: Jan. 9, 2007

(54) APPARATUS FOR FORMING IMAGES WITH PROPER GAMMA CORRECTION

(75) Inventors: Takayuki Maruta, Kanagawa (JP); Minori Uchida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1039 days.

(21) Appl. No.: 10/114,265

(22) Filed: Apr. 3, 2002

(65) Prior Publication Data

US 2002/0159107 A1    Oct. 31, 2002

(30) Foreign Application Priority Data

Apr. 20, 2001  (JP)  ............... 2001-122245

(51) Int. Cl.  
*G06F 15/00*  (2006.01)
(52) U.S. Cl. ............ 358/1.9; 358/461; 358/448; 358/519; 358/3.13; 358/3.14; 382/274
(58) Field of Classification Search ............. 358/1.9, 358/461, 519; 382/274  
See application file for complete search history.

(56) References Cited

U.S. PATENT DOCUMENTS

| | | | |
|---|---|---|---|
| 4,524,388 A * | 6/1985 | Abe et al. ............... 348/251 |
| 4,813,046 A | 3/1989 | Shimada | |
| 4,972,500 A * | 11/1990 | Ishii et al. ............. 382/274 |
| 5,077,605 A * | 12/1991 | Ikeda et al. ............ 358/521 |
| 5,214,753 A * | 5/1993 | Lee et al. ............... 345/610 |
| 5,220,383 A | 6/1993 | Enoki et al. | |
| 5,227,842 A | 7/1993 | Hayashi et al. | |
| 5,239,344 A | 8/1993 | Enoki et al. | |
| 5,245,391 A | 9/1993 | Suzuki et al. | |
| 5,270,783 A | 12/1993 | Bisaiji et al. | |
| 5,311,263 A | 5/1994 | Suzuki et al. | |
| 5,384,628 A | 1/1995 | Takami et al. | |
| 5,389,733 A | 2/1995 | Enoki et al. | |
| 5,508,794 A | 4/1996 | Ikesue et al. | |
| 5,627,630 A | 5/1997 | Matsumae et al. | |
| 5,644,409 A * | 7/1997 | Irie et al. ............... 358/461 |
| 5,671,470 A | 9/1997 | Maruta et al. | |
| 5,724,634 A | 3/1998 | Maruta | |
| 5,819,145 A | 10/1998 | Tanaka et al. | |
| 5,826,146 A | 10/1998 | Maruta et al. | |
| 5,835,825 A | 11/1998 | Maruta | |
| 5,860,038 A | 1/1999 | Kato et al. | |
| 5,881,334 A | 3/1999 | Maruta et al. | |

(Continued)

FOREIGN PATENT DOCUMENTS

DE    37 27 808    2/1988

(Continued)

OTHER PUBLICATIONS

U.S. Appl. No. 10/114,265, filed Apr. 3, 2002, Maruta et al.

(Continued)

*Primary Examiner*—Kimberly Williams  
*Assistant Examiner*—Beniyam Menberu  
(74) *Attorney, Agent, or Firm*—Oblon, Spivak, McClelland, Maier & Neustadt, P.C.

(57) ABSTRACT

An apparatus for forming an image includes a photosensitive body, an optical write unit which scans a light beam along a main scan path on a photosensitive body to create a latent image thereon, the light beam having power levels corresponding to multi-level image data, and a shading correction unit which corrects shading along the main scan path by making adjustment to the multi-level image data along the main scan path, and changes the adjustment on a condition-specific basis.

10 Claims, 14 Drawing Sheets

U.S. PATENT DOCUMENTS

| | | | |
|---|---|---|---|
| 5,886,724 A * | 3/1999 | Kuwabara et al. | 347/188 |
| 6,055,386 A | 4/2000 | Kato et al. | |
| 6,160,569 A | 12/2000 | Fujimori et al. | |
| 6,226,481 B1 | 5/2001 | Yoneda et al. | |
| 6,356,363 B1 * | 3/2002 | Cooper et al. | 358/1.9 |
| 6,603,566 B1 * | 8/2003 | Shono | 358/1.13 |
| 6,704,457 B1 * | 3/2004 | Sugiura | 382/274 |
| 6,977,757 B1 * | 12/2005 | Takahashi et al. | 358/3.05 |

FOREIGN PATENT DOCUMENTS

| | | |
|---|---|---|
| EP | 0 577 405 | 1/1994 |
| EP | 0 851 663 | 7/1998 |
| EP | 0 886 435 | 12/1998 |
| EP | 0 952 727 | 10/1999 |
| JP | 11-286137 | 10/1999 |

OTHER PUBLICATIONS

U.S. Appl. No. 10/373,050, filed Feb. 26, 2003, Yoshikawa et al.
U.S. Appl. No. 10/342,370, filed Jan. 15, 2003, Namiki et al.
U.S. Appl. No. 10/660,699, filed Sep. 12, 2003, Ishibashi et al.
U.S. Appl. No. 10/746,060, filed Dec. 29, 2003, Enoki et al.
U.S. Appl. No. 09/802,953, filed Mar. 12, 2001, Sugihara.
U.S. Appl. No. 09/944,076, filed Sep. 4, 2001, Ariizumi et al.
U.S. Appl. No. 09/976,159, filed Oct. 15, 2001, Hatori et al.
U.S. Appl. No. 09/985,000, filed Jan. 11, 2001, Maruta et al.
U.S. Appl. No. 09/998,316, filed Mar. 12, 2001, Shintani.
U.S. Appl. No. 10/098,591, filed Mar. 18, 2002, Kurosu et al.
U.S. Appl. No. 10/212,714, filed Aug. 7, 2002, Sugihara.
U.S. Appl. No. 10/322,600, filed Dec. 19, 2002, Enoki et al.

* cited by examiner

FIG.15

| CORRECTION TABLE | SHADING CORRECTION | | | | | | | | |
|---|---|---|---|---|---|---|---|---|---|
| | POSITION 1 | POSITION 2 | POSITION 3 | POSITION 4 | POSITION 5 | POSITION 6 | POSITION 7 | POSITION 8 | POSITION 9 |
| 1 | 0.08 | 0.06 | 0.04 | 0.02 | 0.00 | 0.02 | 0.04 | 0.06 | 0.08 |
| 2 | 0.12 | 0.09 | 0.06 | 0.03 | 0.00 | 0.03 | 0.06 | 0.09 | 0.12 |
| 3 | 0.16 | 0.12 | 0.08 | 0.04 | 0.00 | 0.04 | 0.08 | 0.12 | 0.16 |
| 4 | 0.20 | 0.15 | 0.10 | 0.05 | 0.00 | 0.05 | 0.10 | 0.15 | 0.20 |
| 5 | 0.24 | 0.18 | 0.12 | 0.06 | 0.00 | 0.06 | 0.12 | 0.18 | 0.24 |
| 6 | 0.28 | 0.21 | 0.14 | 0.07 | 0.00 | 0.07 | 0.14 | 0.21 | 0.28 |

FIG.16

| DEVELOPMENT $\gamma$ | CORRECTION TABLE |
|---|---|
| $\gamma < 2.5$ | 1 |
| $2.5 \leqq \gamma < 2.8$ | 2 |
| $2.8 \leqq \gamma < 3.1$ | 3 |
| $3.1 \leqq \gamma < 3.4$ | 4 |
| $3.4 \leqq \gamma < 3.7$ | 5 |
| $3.7 \leqq \gamma$ | 6 |

FIG.17

| SENSOR OUTPUT (V) | CORRECTION TABLE |
|---|---|
| $2.5 \leqq OUT$ | 1 |
| $2.3 \leqq OUT < 2.5$ | 2 |
| $2.1 \leqq OUT < 2.3$ | 3 |
| $1.7 \leqq OUT < 1.9$ | 4 |
| $1.5 \leqq OUT < 1.7$ | 5 |
| $OUT < 1.5$ | 6 |

APPARATUS FOR FORMING IMAGES WITH PROPER GAMMA CORRECTION

BACKGROUND OF THE INVENTION

1. Field of the Invention

The present invention generally relates to an image formation apparatus such as a facsimile apparatus.

2. Description of the Related Art

An image formation apparatus may use a laseroptics write device as a write means to form an image on a photosensitive body serving as an image holder where the formation of an image is done by use of multi-level laser powers corresponding to multi-level data values. The laser optical system uses a laser source that emits a laser beam modulated according to data, and scans the laser beam in a main scan direction by use of a polygon mirror after the laser beam passes through a collimator lens, an aperture, and a cylinder lens. The laser beam reflected by the polygon mirror is shone on the photosensitive body through an fθ lens, thereby writing data in the photosensitive body.

In the laser optical system, the power of laser light may differ depending on the position on the photosensitive body as shown in FIG. 3 due to the shading characteristic of the laser optical system even if the laser source emits the laser beam at a constant power along the main scan direction. The laser power on the photosensitive body is highest at the center of the main scan path, and drops towards the ends thereof. In order to achieve a constant laser power on the photosensitive body, the power of laser light should be corrected as shown in FIG. 4, thereby improving image quality. Such write device is disclosed in Japanese Patent Laid-open Application No. 11-286137.

The write device of Japanese Patent Laid-open Application No. 11-286137 corrects the laser power in order to achieve constant laser power on the photosensitive body. Because of sensitivity fluctuation of the photosensitive body, height fluctuation of the electric charger, etc., the correction of laser power based on fixed settings may not be effective always, resulting in a failure to sufficiently improve image quality in some cases.

When a development process is highly efficient, for example, the fluctuation of image density may be observed between the center and the ends of the main scan path. The shading correction is aimed at correcting the variation of laser power (becoming weaker toward the ends) along the main scan path on the photosensitive body when such variation is caused by the optical system. Since the shading correction is not perfect, charged potential on the photosensitive body may differ in the main scan direction as shown in FIG. 6. When the latent image is visualized on the photosensitive body, therefore, development potential differs in the main scan direction as shown in FIG. 7, creating varying degrees of development along the main scan path, thereby generating varying image density.

Accordingly, there is a need for an image formation apparatus which can improve image quality.

There is another need for an image formation apparatus which can improve image quality by correcting shading with respect to all colors in a balanced manner.

There is yet another need for an image formation apparatus which can improve image quality by applying optimum shading correction with respect to each dither patterns.

There is a further need for an image formation apparatus which can improve image quality by applying optimum shading correction with respect to each selected image-type mode.

There is a yet further need for an image formation apparatus for which additional software is kept minimum by simplifying computations.

There is a still further need for an image formation apparatus which can produce high-quality images having a proper gray balance.

SUMMARY OF THE INVENTION

It is a general object of the present invention to provide an image formation apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an image formation apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an apparatus for forming an image according to the present invention includes a photosensitive body, an optical write unit which scans a light beam along a main scan path on a photosensitive body to create a latent image thereon, the light beam having power levels corresponding to multi-level image data, and a shading correction unit which corrects shading along the main scan path by making adjustment to the multi-level image data along the main scan path, and changes the adjustment on a condition-specific basis.

In the apparatus described above, the light power of the optical write unit is adjusted on a condition-specific basis by the shading correction unit, so that the variation (shading) of light power on the photosensitive body is corrected properly in current conditions, thereby improving image quality.

According to one aspect of the present invention, the shading correction unit adjusts the laser power along the main scan path on a color-specific basis, so that shading is corrected with a proper color balance, thereby improving image quality.

According to another aspect of the present invention, the shading correction unit adjusts the laser power in response to changes of dither patterns used for image processing, so that optimum shading correction is attained with respect to each dither pattern, thereby improving image quality.

Other objects and further features of the present invention will be apparent from the following detailed description when read in conjunction with the accompanying drawings.

BRIEF DESCRIPTION OF THE DRAWINGS

FIG. 15 is a table that defines correction values of writing laser power with respect to successive positions along the main scan path;

FIG. 16 is a table that defines which correction table is to be selected for a particular gamma value;

FIG. 17 is a table that defines which correction table is to be selected for a particular sensor output;

DESCRIPTION OF THE PREFERRED EMBODIMENTS

In the following, embodiments of the present invention will be described with reference to the accompanying drawings.

Figure 2:
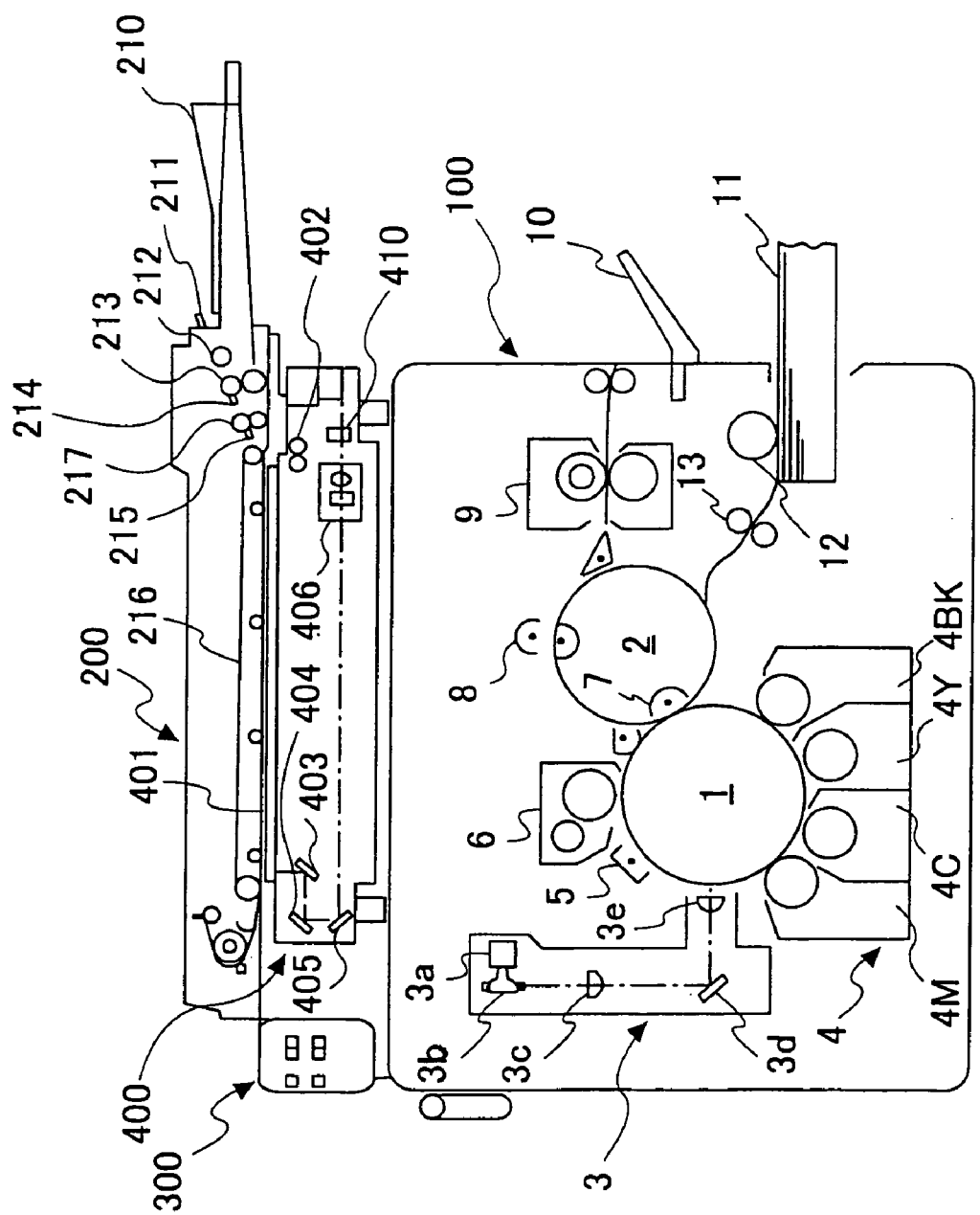
FIG. 2 is an illustrative drawing showing the first embodiment of the present invention.
Figure 3:
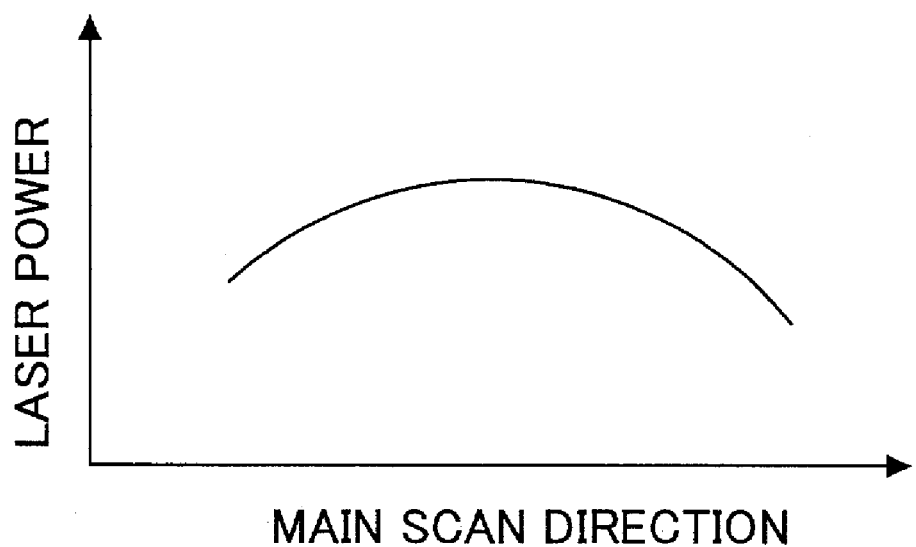
FIG. 3 is a chart showing the relationship between laser power and positions in a main scan direction.
Figure 4:
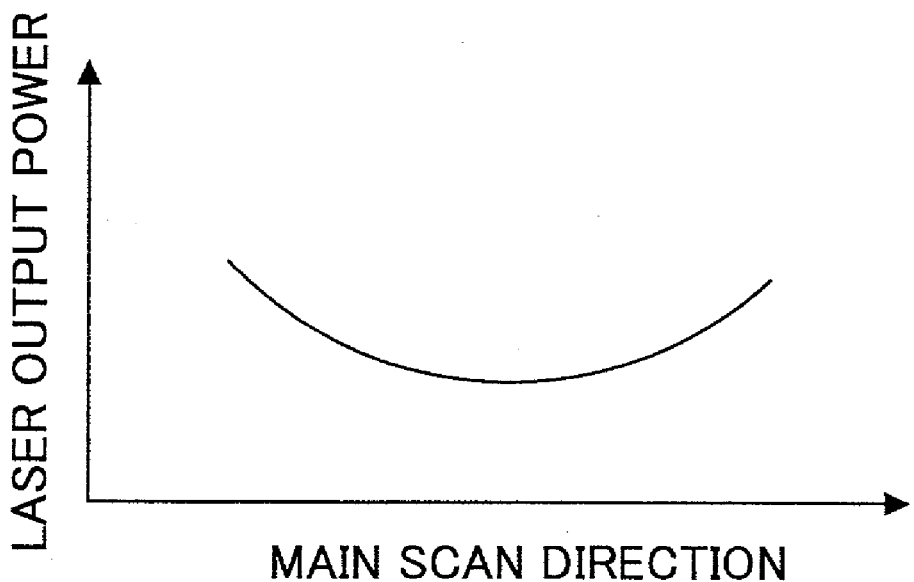
FIG. 4 is a chart showing the correction of laser power that should be made to achieve constant laser power along a main scan path.

FIG. 2 is an illustrative drawing showing a first embodiment of the present invention. The first embodiment corresponds to a color image formation apparatus based on a digital color copier. A description will be given first with regard to image formation by the first embodiment. FIG. 2 shows a laser printer 100 serving as an image formation unit, a automatic document feeder 200 (hereinafter called ADF), an operation panel 300 serving as an operation unit, and an image scanner 400 serving as an image scan unit.

The image scanner 400 is an image scan apparatus that reads an image on a document placed on a contact glass 401 by having the mechanical carriage unit move at a constant speed in a horizontal direction in FIG. 2 (in the sub-scan direction). The carriage unit carries a lamp 402, and is situated under the contact glass 401. Light emitted form the lamp 402 illuminates the document placed on the contact glass 401, and the reflected light (i.e., a document image) is supplied to a dichroic prism 410 through mirrors 403–405 and a lens 406. The dichroic prism 410 serves as a color separation means.

The dichroic prism 410 separates the incident light into red R, green G, and blue B according to its wavelengths. The light of three separated colors is supplied to respective image sensors comprised of one-dimensional CCDs (charge coupled devices) where photoelectric conversion takes place, so that the document image is separated into three color components RGB on a scan-line-specific basis in the main scan direction, and image reading is thus achieved. The image signals RGB output from the image sensors are converted by A/D converters (not shown) into digital image data RGB each comprised of 8 bits, for example.

The ADF 200 is situated above the image scanner 400, and has a document stage 210 on which a stack of document sheets is placed. At the time of document feed, an inviting roller 212 pulls in document sheets from the document stage 210, and separation rollers 213 take in only a document sheet on the top. This document sheet is carried and placed on the contact glass 401 of the image scanner 400 by pull-out rollers 217 and a conveyor belt 216. The document sheet is placed at a predetermined scan position.

After the image scanner 400 completes an operation of reading a document sheet on the contact glass 401, the document sheet on the contact glass 401 is removed by the conveyor belt 216, and a next document sheet will be placed at the predetermined scan position. A document detection sensor 211 is situated in front of the inviting roller 212, and optically detects whether the stack of document sheets is placed on the document stage 210. Further, a document tip detection sensor 214 is provided between the separation rollers 213 and the pull-out rollers 217, and optically detects the tip and size of the document sheet.

The document tip detection sensor 214 is comprised of a plurality of sensors arranged at respective positions along the main scan direction, and detects the document size in the main scan direction, i.e., the document width, by identifying a pattern of sensor detection status. A pulse generator is provided that supplies pulses to a document feed motor (not shown) at a rate corresponding to a desired rate of rotation. A control device of the ADF 200 measures the time at which a document sheet passes the document tip detection sensor 214, thereby identifying the document size in the sub-scan direction, i.e., the length of the document sheet. The inviting roller 212 and the separation rollers 213 are driven by a document feed motor (not shown), and the pull-out rollers 217 and the conveyor belt 216 are driven by a carrier motor (not shown). A resist sensor 215 that is an optical sensor detects a document sheet further downstream than the pull-out rollers 217.

The laser printer 100 uses the photosensitive body serving as an image holder to reproduce an image. A photosensitive drum 1 is used as the photosensitive body. Alternatively, a photosensitive belt may be used. The photosensitive drum 1 is surrounded by various units for performing a series of electrostatic photography processes, including an electric charger 5 serving as an electric charging means, an optical write unit 3 serving as a write means, a development unit 4 serving as a development means, a transfer drum 2 serving as an intermediary transfer body, and a cleaning unit 6. The optical write unit 3 is provided with a semiconductor laser (i.e., laser diode LD) serving as a laser source. Laser light emitted form this LD passes through an optical system comprised of a collimator lens, an aperture, and a cylinder lens, and is scanned in the main scan direction by a rotating polygon mirror 3b serving as a scan means. The scanned light beam is focused on the surface of the photosensitive drum 1 after passing through an optical system comprised of an fθ lens 3c, a mirror 3d, and a lens 3e The rotating polygon mirror 3b is rotated at high speed by a polygon motor 3a.

An image control unit (not shown) controls a signal that drives the LD such that the light emission timing of the LD driven by multi-level image data synchronizes with the laser beam scan by the rotating polygon mirror 3b. That is, the light emission of the LD is controlled such that the laser beam is scanned in the main scan direction on the photosensitive drum 1 by starting from a predetermined start position. The photosensitive drum 1 is charged to high potential evenly over its surface through corona discharge by the electric charger 5, and is exposed to the laser light supplied from the optical write unit 3, resulting in the generation of a latent image. The latent image on the photosensitive drum 1 is visualized by the development unit 4.

The development unit 4 includes four development units 4M, 4C, 4Y, and 4Bk for visualizing the latent image on the photosensitive drum 1 in magenta M, cyan C, yellow Y, and black Bk, respectively, for example. One of the four development units 4M, 4C, 4Y, and 4Bk is selectively moved to a development position to attend to a development process, so that the latent image on the photosensitive drum 1 is visualized in a corresponding one of the colors M, C, Y, and Bk.

A print sheet serving as a transfer material that is stored in a sheet supply cassette 11 is pulled out by a sheet supply roller 12, and is supplied to the surface of the transfer drum 2 at proper timing by resist rollers 13. The print sheet is then stuck on the surface of the transfer drum 2, and moves along with the rotation of the transfer drum 2. The toner image on the photosensitive drum 1 is transferred on to the print sheet on the transfer drum 2 by a transfer charger 7 serving as a transfer means.

When a monochrome copy mode is selected, a monochrome image formation process is performed. In this case, light emitted from the LD of the optical write unit 3 is modulated by monochrome image data, and a toner image corresponding to the monochrome image is formed on the photosensitive drum 1. After this toner image is transferred on to a print sheet, the print sheet is separated from the transfer drum 2. The print sheet has a toner image thereon fixed by a fixing unit 9, and is then ejected on-to an ejected paper sheet tray 10. When a full color mode is selected, the image formation processes of respective colors are performed to generate images of the respective colors Bk, M, C, and Y successively on the photosensitive drum 1, and these images successively formed on the photosensitive drum 1 are transferred on to a single print sheet in an overlapping manner.

In this case, the LD of the optical write unit 3 is modulated by Bk image data so as to create a Bk toner image on the photosensitive drum 1. The Bk toner image is transferred on to a print sheet on the transfer drum 2. With the print sheet stuck on the transfer drum 2, the LD of the optical write unit 3 is modulated by M image data so as to form an M toner image on the photosensitive drum 1, which is then transferred on to the print sheet on the transfer drum 2 such as to overlap the Bk toner image.

Further, the LD of the optical write unit 3 is modulated by C image data so as to form a C toner image on the photosensitive drum 1, which is then transferred on to the print sheet on the transfer drum 2 such as to overlap the Bk toner image and the M toner image, followed by the LD of the optical write unit 3 being modulated by Y image data so as to form a Y toner image on the photosensitive drum 1, which is then transferred on to the print sheet on the transfer drum 2 such as to overlap the Bk toner image, the M toner image, and the C toner image, thereby forming a full-color image. After the completion of image transfer of all the colors Bk, M, C, and Y, the print sheet is separated from the transfer drum 2 through removal of charge by a separation charger 8, and then has the toner images thereon fixed by the fixing unit 9 before ejection on to the ejected paper sheet tray 10.

Figure 1:
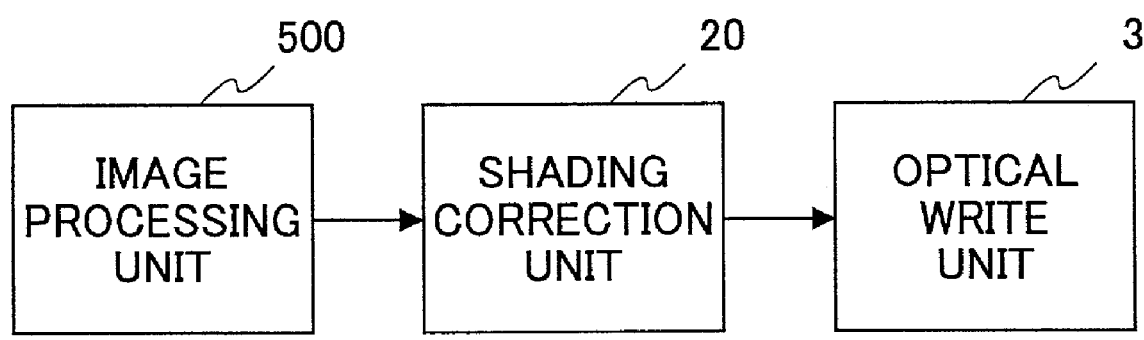
FIG. 1 is a block diagram showing a circuit configuration of a first embodiment.

FIG. 1 is a block diagram showing a circuit configuration of the first embodiment. An image processing unit 500 performs image-scanner gamma correction, image-data conversion into Bk, M, C, and Y, selection of respective image data Bk, M, C, and Y, conversion into multi-level values through dither processing, etc., with respect to digital image data of respective colors R, G, B obtained from the image scanner 400. The dither pattern is changed depending on the selected image-type mode indicating an image mode such as a character mode or a photograph mode. In this manner, the image processing unit 500 has a multi-level generation means that converts the image data into multi-level values through dither processing or the like. The selected image-type mode indicative of a character mode, a photograph mode, or the like is selected by a mode selection key serving as a mode selection means provided on the operation panel 300. In response to the selected image-type mode, the image processing unit 500 changes dither patterns used for dither processing.

Figure 5:
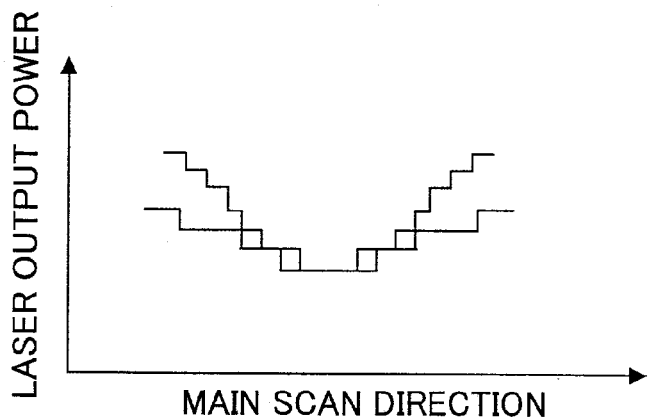
FIG. 5 is a chart showing the progressive adjustment of laser power that should be made to achieve constant laser power along a main scan path.
Figure 6:
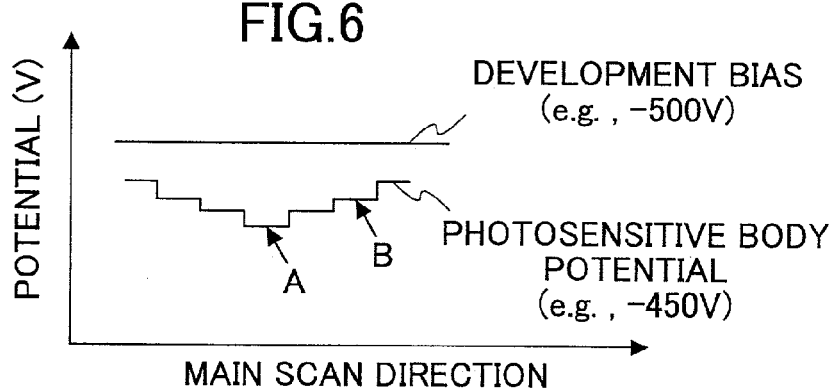
FIG. 6 is a chart showing charged potential on a photosensitive body that varies in the main scan direction.
Figure 7:
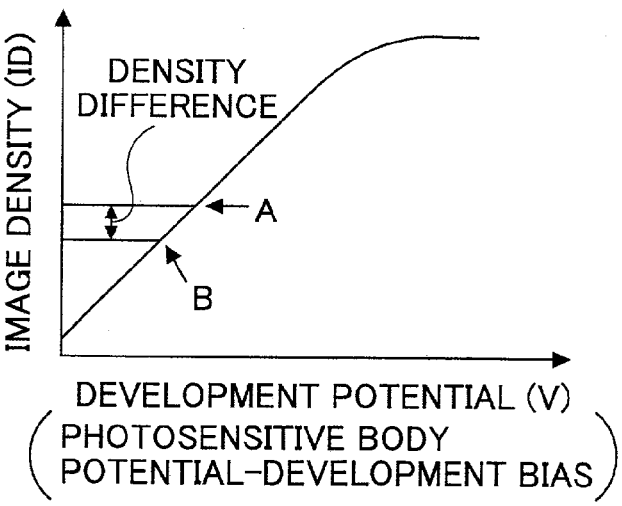
FIG. 7 is a chart showing the relationship between development potential and image density.

A shading correction unit 20 serving as a light-intensity adjustment means receives the multi-level image data of each color Bk, M, C, and Y one after another from the image processing unit 500, and corrects the received image data such that the power of the laser beam on the photosensitive drum 1 supplied from the optical write unit 3 is the same along the main scan path as long as the data supplied from the image processing unit 500 is the same. To this end, the laser power of the optical write unit 3 is progressively adjusted as shown in FIG. 5, thereby compensating for variation (shading) of laser power on the photosensitive drum 1 caused by the optical system of the optical write unit 3.

In this embodiment, a full-color image is created by superimposing toner images of respective color. If the shading correction is carried out in the same manner for all the colors, therefore, there is a risk of creating improper color balance. In consideration of this, the shading correction unit 20 selects optimum correction values for the image data of respective colors, and corrects the image data of respective colors based on the respective optimum correction values such that the laser power along the main scan path becomes the same for the same data.

Further, when a dither pattern differs, a variation in image density appears differently. In consideration of this, the shading correction unit 20 selects optimum correction values for image data according to the types of dither patterns used for the dither processing in the image processing unit 500.

When the selected image-type mode differs, a used dither pattern is different, so that a variation in image density appears differently. In consideration of this, the shading correction unit 20 selects optimum correction values for image data according to the selected image-type modes selected by the operation panel 300.

According to the first embodiment, the laser power of the optical write unit 3 serving as a write unit is progressively adjusted by the shading correction unit 20 serving as the light-intensity adjustment unit, so that the variation (shading) of laser power on the photosensitive drum 1 is corrected, thereby improving image quality.

According to the first embodiment, the shading correction unit 20 adjusts the laser power along the main scan path on a color-specific basis in the image formation apparatus for forming a full-color image, so that shading is corrected with a proper color balance, thereby improving image quality.

According to the first embodiment, the shading correction unit 20 changes factors for laser power adjustment in response to changes of dither patterns in the image formation apparatus performing dither processing, so that optimum shading correction is attained with respect to each dither pattern, thereby improving image quality.

According to the first embodiment, the shading correction unit 20 changes factors for laser power adjustment in response to changes of selected image-type modes in the image formation apparatus that uses a selected one of the image-type modes, so that optimum shading correction is attained with respect to each selected image-type mode, thereby improving image quality.

Figure 8:
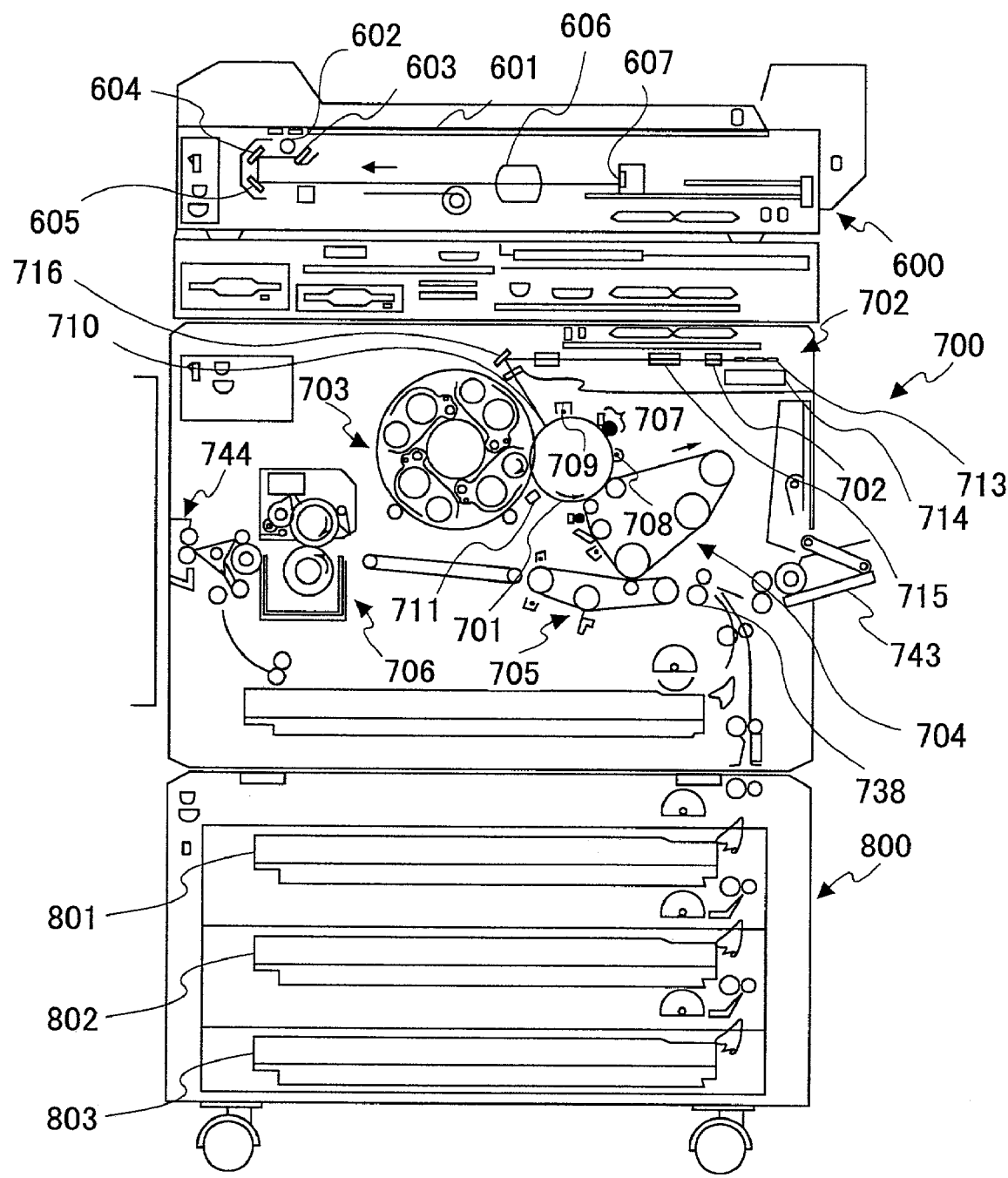
FIG. 8 is an illustrative drawing showing a schematic configuration of a color copier according to a second embodiment of the present invention.
Figure 9:
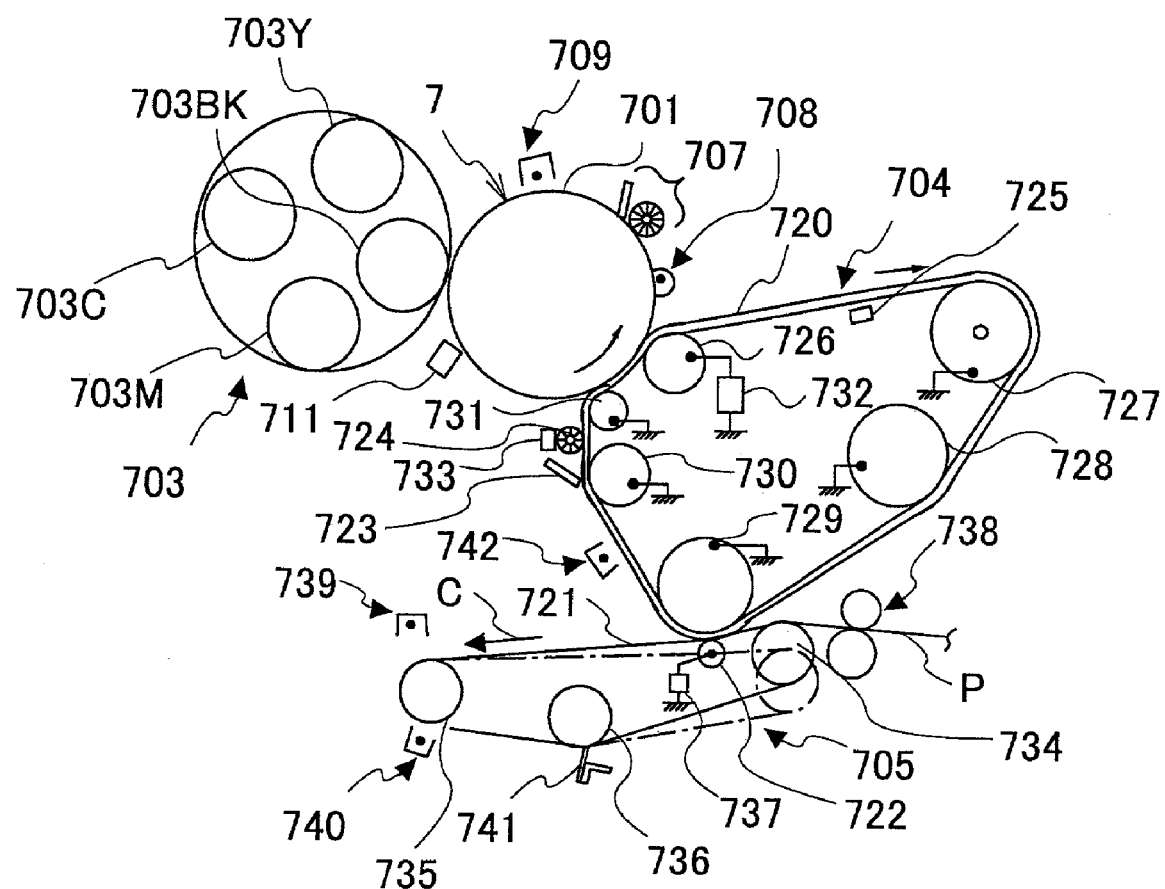
FIG. 9 is an illustrative drawing showing a schematic configuration of an image formation unit of the color copier.

In the following, a second embodiment of the present invention will be described. The second embodiment is directed to an image formation apparatus based on an electro-photography color copier. FIG. 8 is an illustrative drawing showing a schematic configuration of the color copier according to the second embodiment. FIG. 9 is an illustrative drawing showing a schematic configuration of an image formation unit of the color copier. The color copier includes a color image scan unit (color scanner) 600, a color image recording unit (color printer) 700, a paper-sheet supply unit 800, etc.

The color scanner 600 uses a lamp 602 to illuminate a document placed on a contact glass 601, and the reflected light forms an image on a color sensor 607 through mirrors 603, 604, and 605 and a lens 606. Movement of the lamp 602 and the mirrors 603–605 makes it possible to scan the document, so that color document image information is read with respect to each of separated colors such as red R, green G, and blue B, followed by being converted into electrical image signals. One document scan produces image data for the three colors R, G, and B. The color sensor 607 includes a RGB color separation means and a photoelectric conversion device such as a CCD in this embodiment, and reads the document image to produce the color images R, G, and B at once.

An image processing unit (not shown) attends to color conversion processing based on the levels of image signals separated into R, G, and B as these image signals are supplied from the color scanner 600, thereby successively producing color image data of black Bk, cyan C, magenta M, and yellow Y. The color printer 700 forms images of respective colors Bk, C, M, and Y one after another in response to the color image data Bk, C, M, and Y from the image processing unit. These images are superimposed one over another, thereby producing a full-color image based on four-color superimposition.

The operation of the color scanner 600 for obtaining the color image data,Bk, C, M, and Y is as follows. The color scanner 600 receives a scanner start signal that is synchronized with the operation of the color printer 700. In response, an optical system comprised of the lamp 602 and the mirrors 603 through 605 moves to the left as shown by an arrow, thereby scanning a document sheet. Color image data of three colors RGB are supplied to the image processing unit, which in turn produces color image data in a single color in response to one scan operation. This operation is repeated four times, so that color image data are obtained in four different colors. The color printer 700 forms images of the respective colors Bk, C, M, and Y based on the color image data Bk, C, M, and Y supplied from the image processing unit. These images are superimposed one over another, thereby producing a full-color image based on the four-color superimposition.

The color printer 700 includes a photosensitive body (which is a drum shape in this example) 701 serving as an image holder, an optical write unit 702 serving as a write means, a revolver development unit 703 serving as a development means, an intermediary transfer unit 704, a second transfer unit 705 serving as a second transfer means, a fixing unit 706, etc.

The photosensitive body 701 is driven by a driver unit (not shown) so as to rotate counterclockwise as shown by an arrow, and is surrounded by a photosensitive body cleaning unit 707, a charge removal lamp 708, a charger 709 serving as a charging means, a potential sensor 710, a selected development unit of the revolver development unit 703, a reflection density sensor 711 implemented by using an optical sensor, the intermediary transfer unit 704, etc. The charger 709 receives a voltage power from a charger power supply (not shown), and charges the photosensitive body 701 evenly over the surface thereof. The potential sensor 710 detects the surface potential of the photosensitive body 701, and the reflection density sensor 711 detects the reflection density of the photosensitive body 701 by an optical means.

The optical writing unit 702 converts the color image data into optical signals as the color image data is supplied from the color scanner 600 via the image processing unit, and attends to optical writing of a document image on the charged surface of the photosensitive body 701. This creates a latent image on the photosensitive body 701. The optical writing unit 702 includes a semiconductor laser 712 serving as a light source, a laser drive control unit (not shown), a polygon mirror 713, a drive motor 714, an f/θ lens 715, a reflection mirror 716, etc. The semiconductor laser 712 is controlled by the laser drive control unit in response to the color image data supplied from the color scanner 600 through the image processing unit, thereby emitting a laser beam modulated by the color image data. The laser light is scanned in the main scan direction by the polygon mirror 713, and is shone on the photosensitive body 701 via the f/θ lens 715, the reflection mirror 716, and the like.

Figure 10:
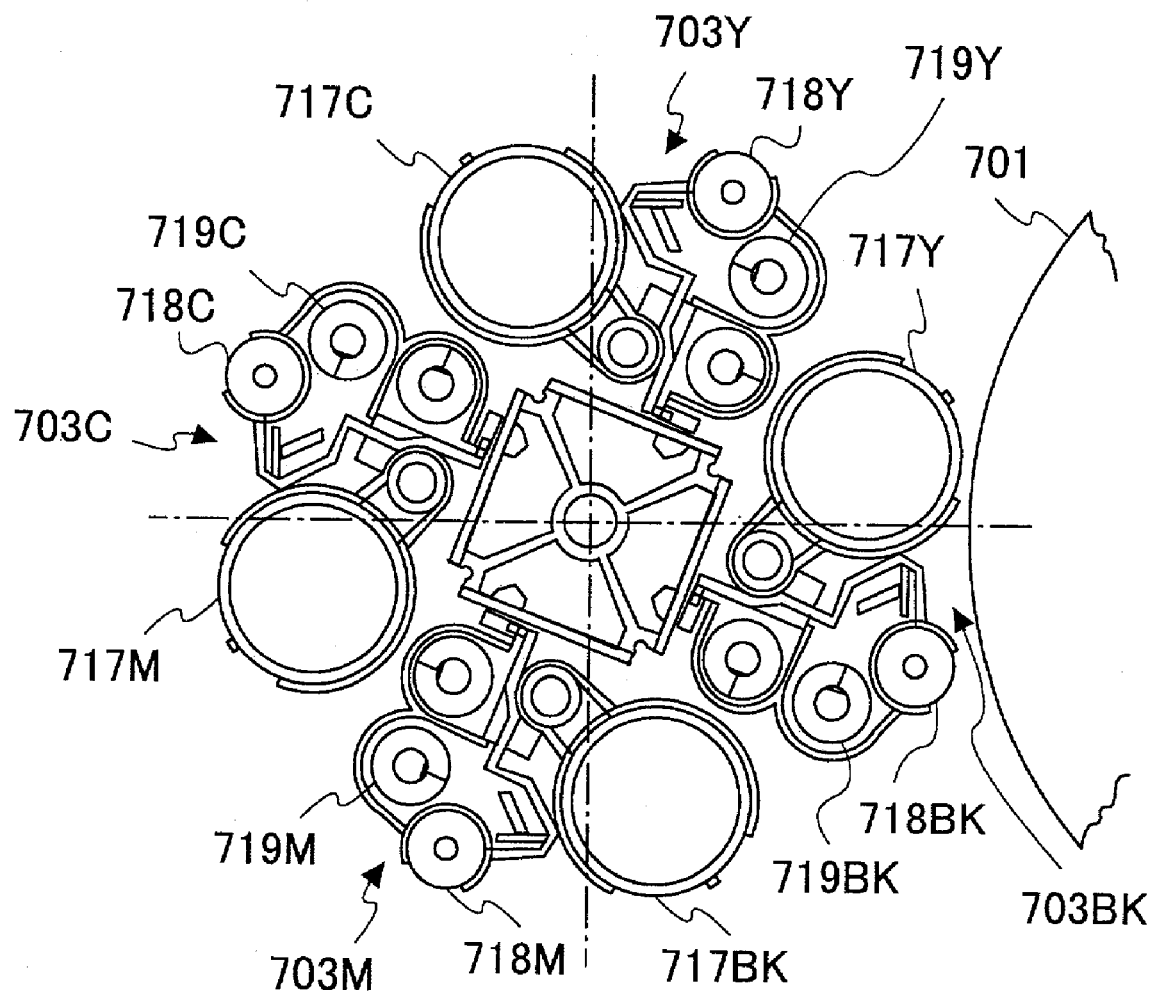
FIG. 10 is an illustrative drawing showing a configuration of a revolver development unit.

As shown in FIG. 10, the revolver development unit 703 includes a Bk development unit 703Bk, a C development unit 703C, a M development unit 703M, a Y development unit 703Y, a revolver driving unit for revolving these development units, and toner bottles 717Bk, 717C, 717M, and 717Y belonging to the respective colors Bk, C, M, and Y and supplying Bk toner, C toner, M toner, and Y toner to the respective development units 703Bk, 703C, 703M, and 703Y.

The development units 703Bk, 703C, 703M, and 703Y include development rollers 718Bk, 718C, 718M, and 718Y serving as development agent holders, which bring brushes of development agent in contact with the surface of the photosensitive body 701, and rotate so as to develop the latent image on the photosensitive body 701. The development units 703Bk, 703C, 703M, and 703Y further include development agent paddles 719Bk, 719C, 719M, and 719Y serving as stirring means that rotate for the purpose of scooping and stirring the development agent. The toner supply unit of each color is driven by a toner supply motor (not shown) so as to supply toner from the toner bottles 717Bk, 717C, 717M, and 717Y to the development units 703Bk, 703C, 703M, and 703Y, respectively. The development units 703Bk, 703C, 703M, and 703Y mix the development agents with the toners supplied by the toner supply units by use of the development agent paddles 719Bk, 719C, 719M, and 719Y.

The development units 703Bk, 703C, 703M, and 703Y store therein a two-component development agent comprised of a Bk toner and a ferrite carrier, a two-component development agent comprised of a C toner and a ferrite carrier, a two-component development agent comprised of an M toner and a ferrite carrier, and a two-component development agent comprised of a Y toner and a ferrite carrier, respectively. The toners Bk, C, M, and Y are stirred with the ferrite carriers so as to be charged to a negative potential. Development sleeves 718Bk, 718C, 718M, and 718Y of the respective development-units 703Bk, 703C, 703M, and 703Y receive a development bias from a development bias power supply (not shown) serving as a development bias applying means. The development bias is comprised of an alternating voltage Vac superimposed on a negative DC voltage Vdc. In this manner, the development sleeves 718Bk, 718C, 718M, and 718Y are biased at a predetermined potential relative to a metal base layer of the photosensitive body 701.

In a standby state of the color copier, the revolver development unit 703 has the Bk development unit 703Bk situated 45 degrees away from the development position. When a copying operation starts, the color scanner 600 starts scanning a document image at predetermined timing in order to obtain Bk color image data. The color image data is then supplied from the color scanner 600 to the optical writing unit 702 via the image processing unit, and the optical writing unit 702 starts the process of optical writing by use of a laser beam according to the Bk color image data supplied from the image processing unit, thereby starting the generation of a latent image (hereinafter, a latent image generated based on Bk image data is called a Bk latent image, and, by the same token, a C latent image, an M latent image, and a Y latent image are used to refer to the latent images based on the C image data, the M image data, and the Y image data, respectively).

The revolver development unit 703 moves the Bk development unit 703Bk to the development position before the tip of the Bk latent image on the photosensitive body 701 reaches the development position. The revolver development unit 703 starts rotating the development sleeve 718Bk in the Bk development unit 703Bk, and develops the Bk latent image on the photosensitive body 701 by the Bk toner. Development of the Bk latent image continues on the photosensitive body 701, and the tail of the Bk latent image reaches and then passes the development position. When the tail moves predetermined distance away from the development position, the revolver development unit 703 rotates so as to place a development unit of a next color at the development position. This operation is completed at least before the tip of a latent image of next image data reaches the development position.

The intermediary transfer unit 704 includes an intermediary transfer belt 720 that is suspended between a plurality of rollers. Around the intermediary transfer belt 720 is provided a second transfer belt 721 serving as a transfer means of the second transfer unit 705, a second transfer bias roller 722 serving as a second transfer charge provision means, a belt cleaning unit 723 serving as an intermediary transfer body cleaning means, and an lubricant applying brush 724 serving as an oil applying means, all of which face the intermediary transfer belt 720.

A position detection mark is provided on an inner surface (or outer surface) of the intermediary transfer belt 720. An optical sensor 725 serving as a mark detection sensor is provided between a bias roller 726 and a drive roller 727 on which the intermediary transfer belt 720 is suspended.

The intermediary transfer belt 720 is suspended on the first transfer bias roller 726 serving as a first transfer charge provision means, the belt drive roller 727, a belt tension roller 728, a second transfer opposing roller 729, a cleaning opposing roller 730, and an earth roller 731. These rollers 726 through 731 are made of conductive material, and the rollers 727 through 731 are connected to the ground, with an exception of the first transfer bias roller 726.

The first transfer bias roller 726 receives a transfer bias from a first transfer power supply 732 where the transfer bias is controlled to be a predetermined amount of current or voltage in accordance with the number of toner images superimposed on the intermediary transfer belt 720. The intermediary transfer belt 720 is moved in the direction shown by an arrow through the rotation of the belt drive roller 727 driven by a drive motor (not shown). The intermediary transfer belt 720 is made of semiconductor or an insulating material, having a single-layer or multilayer structure.

In a transfer unit (first transfer unit) that transfers a toner image from the photosensitive body 701 to the intermediary transfer belt 720, the first transfer bias roller 726 and the earth roller.731 support the intermediary transfer belt 720 such as to press it against the photosensitive body 701. This creates a nip portion having a predetermined length between the photosensitive body 701 and the optical writing unit 702.

The lubricant applying brush 724 scratches and polishes the surface of a zinc stearate plate 733 serving as lubricant, and applies the resulting minute particles on to the intermediary transfer belt 720. The lubricant applying brush 724 is controlled by a contacting mechanism (not shown) so as to come in contact with the intermediary transfer belt 720 at predetermined timing.

The second transfer unit 705 includes the second transfer belt 721 suspended on three support rollers 734 through 736. Provision is made to intermittently press a portion of the second transfer belt 721 between the support rollers 734 and 735 against the second transfer opposing roller 729. One of the support rollers 734 through 736 is a drive roller that is driven to rotate by a drive means (not shown). This drive roller drives the second transfer belt 721.

The second transfer bias roller 722 serves as a second transfer means, and is situated such as to have the intermediary transfer belt 720 and the second transfer belt 721 placed between the second transfer opposing roller 729 and the second transfer bias roller 722. The second transfer bias roller 722 is subjected to a transfer bias of a predetermined current provided by a second transfer power supply 737. A contact mechanism (not shown) is provided to control the position of the support roller 734 and the second transfer bias roller 722 such that the second transfer belt 721 and the second transfer bias roller 722 either come in contact with or are detached from the second transfer opposing roller 729. Dotted lines in FIG. 9 indicates the position of the second transfer belt 721 and the support roller 734 detached from the second transfer opposing roller 729, and corresponding solid lines in FIG. 9 illustrates-the position of the second transfer belt 721 and the support roller 734 being pressed against the second transfer opposing roller 729.

At proper timing, a pair of resist rollers 738 insert a print sheet serving,as a transfer material to a gap between the intermediary transfer belt 720 and the second transfer belt 721 that are placed between the second transfer bias roller 722 and the second transfer opposing roller 729.

A portion of the second transfer belt 721 that is suspended on the support roller 735 near the fixing unit 706 is surrounded by the transfer sheet discharger 739 and a belt discharger 740 serving as a transfer-material-holder charge-removal means. Further, a portion of the second transfer belt 721 suspended on the lower-side support roller 736 is in contact with a cleaning blade 741 serving as a transfer-material-holder cleaning means.

The transfer sheet discharger 739 removes electric charge from the print sheet, thereby letting the print sheet separate itself from the second transfer belt 721. The belt discharger 740 removes electric charge remaining on the second transfer belt 721. The cleaning blade 741 removes dusts from the surface of the second transfer belt 721.

In-the color copier as described above, when a repeat copy cycle starts, the photosensitive body 701 and the intermediary transfer belt 720 are rotated as illustrated by arrows by a drive motor (not shown), the rotation of these two units providing an identical linear speed at the first transfer position. The mark provided on the intermediary transfer belt 720 moves along with the movement of the intermediary transfer belt 720, and will be detected at a predetermined position by the optical sensor 25.

With the rotation of the photosensitive body 701 and the intermediary transfer belt 720, the Bk, C, M, and Y toner images are created, and are transferred from the photosensitive body 701 to the intermediary transfer belt 720 through the transfer bias that is applied to the first transfer bias roller 726. As a result a full-color toner image based on the four-color superimposition is created on the surface of the intermediary transfer belt 720.

The toner images are created as follows. The charger 709 negatively charges the surface of the photosensitive body 701 evenly to a predetermined potential by use of corona discharge. At an end of a predetermined time period after detection of the mark on the intermediary transfer belt 720 by the optical sensor, the optical writing unit 702 performs the raster scanning of light on the surface of the photosensitive body 701 according to the Bk image signals supplied from the image processing unit. Portions of the evenly charged surface of the photosensitive body 701 are exposed to light, so as to lose electric charge thereof in proportion to the degree of their exposure to light, thereby generating a Bk latent image.

The Bk latent image is turned into the Bk toner image when the Bk latent image comes in contact with the Bk toner negatively charged on the Bk development roller 718Bk of the Bk development unit 703Bk. In this process, the toner does not stick to portions where the photosensitive body 701 is not exposed to light, and sticks to the portions where the photosensitive body 701 is exposed to light. The Bk toner image formed on the photosensitive body 701 is then transferred on to the surface of the intermediary transfer belt 720, which maintains the same linear velocity at the first transfer position where it comes in contact with the photosensitive body 701. Hereinafter, the transfer of a toner image from the photosensitive body 701 to the intermediary transfer belt 720 is referred to as a belt transfer. Some toner remains on the surface of the photosensitive body 701 after the belt transfer, and is cleaned by the photosensitive body cleaning unit 707 in order to prepare the photosensitive body 701 for subsequent use. Further, the photosensitive body 701 is discharged evenly by the charge removal lamp 708.

With respect to the photosensitive body 701, a C image forming step following the Bk image forming step is performed. Namely, the color scanner 600 scans the document image in order to obtain C image data at predetermined timing, and supplies color image data of three colors R, G, and B to the image processing unit. The image processing unit then provides C image data to the optical writing unit 702. The optical writing unit 702 performs the optical-writing of the C image data on the photosensitive body 701, thereby forming a C latent image on the photosensitive body 701.

The revolver development unit 703 rotates to place the C development unit 703C at the development position after the tail of the Bk latent image on the photosensitive body 701 is gone and before the head of the C latent image arrives. The C latent image is then developed by the C development unit 703C, thereby turning into a C toner image.

The C development unit 703C continues developing the C latent image on the photosensitive body 701 until the tail of the C latent image on the photosensitive body 701 passes the development position. The revolver development unit 703 then revolves to place the M development unit 703M at the development position in the same manner as before. This operation is completed before the head of the M latent image reaches the development position.

The C toner image formed on the photosensitive body 701 is transferred on to the surface of the intermediary transfer belt 720 to be superimposed oh the Bk toner image where the intermediary transfer belt 720 runs at the same linear-speed at the first transfer position as the photosensitive body 701. After the belt transfer, toner remaining on the surface of the photosensitive body 701 is cleaned by the photosensitive body cleaning unit 707 in order to prepare the photosensitive body 701 for subsequent use. Further, the photosensitive body 701 is discharged evenly by the charge removal lamp 708.

With respect to the photosensitive body 701, an M image forming step following the C image forming step is performed. Namely, the color scanner 600 scans the document image in order to obtain M image data at predetermined timing, and supplies color image data of three colors R, G, and B to the image processing unit. The image processing unit then provides M image data to the optical writing unit 702. The optical writing unit 702 performs the optical writing of the C image data on the photosensitive body 701, thereby forming an M latent image on the photosensitive body 701.

The revolver development unit 703 rotates to place the M development unit 703M at the development position after the tail of the C latent image on the photosensitive body 701 is gone and before the head of the M latent image arrives. The M latent image is then developed by the M development unit 703M, thereby turning into an M toner image. The M development unit 703M continues developing the M latent image on the photosensitive body 701 until the tail of the M latent image on the photosensitive body 701 passes the development position. The revolver development unit 703 then revolves to place the Y development unit 703Y at the development position in the same manner as before.

The M toner image formed on the photosensitive body 701 is transferred on to the surface of the intermediary transfer belt 720 to be superimposed on the Bk and C toner images where the intermediary transfer belt 720 runs at the same linear speed at the first transfer position as the photosensitive body 701. After the belt transfer, toner remaining on the surface of the photosensitive body 701 is cleaned by the photosensitive body cleaning unit 707 in order to prepare the photosensitive body 701 for subsequent use. Further, the photosensitive body 701 is discharged evenly by the charge removal lamp 708.

With respect to the photosensitive body 701, a Y image forming step following the M image forming step is performed. Namely, the color scanner 600 scans the document image in order to obtain Y image data at predetermined timing, and supplies color image data of three colors R, G, and B to the image processing unit. The image processing unit then provides Y image data to the optical writing unit 702. The optical writing unit 702 performs the optical writing of the Y image data on the photosensitive body 701, thereby forming a Y latent image on the photosensitive body 701.

The revolver development unit 703 rotates to place the Y development unit 703Y at the development position after the tail of the M latent image On the photosensitive body 701 is gone and before the head of the Y latent image arrives. The Y latent image is then developed by the Y development unit 703Y, thereby turning into a Y toner image. The Y development unit 703Y continues developing the Y latent image on the photosensitive body 701 until the tail of the Y latent image on the photosensitive body 701 passes the development position. The revolver development unit 703 then revolves to place the Bk development unit 703Bk at the development position in the same manner as before.

The Y toner image formed on the photosensitive body 701 is transferred on to the surface of the intermediary transfer belt 720 to be superimposed on the Bk, C, and M toner images where the intermediary transfer belt 720 runs at the same linear speed at the first transfer position as the photosensitive body 701. Thus a full-color image based on the four-color superimposition is obtained. After the belt transfer, toner-remaining on the surface of the photosensitive body 701 is cleaned by the photosensitive body cleaning unit 707 in order to prepare the photosensitive body 701 for subsequent use. Further, the photosensitive body 701 is discharged evenly by the charge removal lamp 708.

In this manner, the toner images of the respective colors Bk, C, M, and Y are successively formed on the photosensitive body 701, and are transferred on to the intermediary transfer belt 720 one after another with respective alignment to the same position, thereby creating a full-color image based on the four-color superimposition.

By the time at which the image formation process starts, a print sheet P is already waiting at the nip of the resist roller 738, having been supplied from one of the paper-sheet supply cassettes 801 through 803 of the paper-sheet supply unit 800 or from a hand-insertion tray 743. The paper-sheet supply unit 800 may accommodate a stack of print sheets of ordinary size up to the A3 size used in Japan and Europe or the DLT size used in the North America. The hand-insertion tray 743 may allow use of various paper sizes such as a longer version of the A3 size, non-standard sizes, a thick paper sheet, etc.

The second transfer opposing roller 729 and the second transfer bias roller 722 together form a nip in the second transfer unit. When the tip of the full-color image on the intermediary transfer belt 720 reaches this nip, the resist rollers 738 are driven to supply the print sheet P such that the tip of the print sheet meets the tip of the full-color image. In this manner, alignment of the print sheet P with the full-color image is achieved.

The print sheet P has the full-color image on the intermediary transfer belt 720 aligned thereto when passing through the second transfer unit. During this passage, a second transfer power supply 737 applies a transfer bias to the second transfer bias roller 722, by which the full-color image on the intermediary transfer belt 720 is transferred on to the print sheet P at once.

The print sheet P has the electric charge thereof removed when it passes under the transfer sheet discharger 739 facing the second transfer belt 721. This transfer sheet discharger 739 is situated further downstream in the travel direction of the second transfer belt 721 than the second transfer unit. The discharged print sheet P is detached from the second transfer belt 721, and is then supplied to the fixing unit 706. The print sheet P has the toner image thereon fixed by the fixing unit 706, and is led by a pair of ejection rollers 744 so as to be stacked face-up on the copy tray provided on the exterior of the apparatus. In this manner, full-color copies are obtained.

The intermediary transfer belt 720 has electric charge thereof removed by a discharger 742 after transferring the toner image on to the print sheet P. Further, toner remaining on the intermediary transfer belt 720 is removed by the belt cleaning unit 723 that is pressed against the intermediary transfer belt 720 by a pressing mechanism (not shown).

At the time of repeat copying, the operation of the color scanner 600 with subsequent image formation on the photosensitive body 701 is performed with respect to the image formation of the first color Bk for a second sheet at predetermined timing immediately after the image formation step relating to the fourth color Y for the first sheet. After transferring the full-color image on to the first print sheet, the intermediary transfer belt 720 receives the Bk toner image for the second sheet through belt transfer on a surface where cleaning is carried out by the belt cleaning unit 723. Operations that follow are the same as those for the first sheet.

The above description has been given with regard to a copy mode for obtaining a 4-color full-color copy. Operations for a 3-color copy mode or a 2-color copy mode are the same as those described above, except that the operations are repeated as many as the number of specified colors.

In the case of a monochrome copy mode, the revolver development unit 703 places only a development unit of a selected color in an operative condition until copying of a predetermined number of sheets is completed. During this copying operation, the belt cleaning unit 723 is pressed against the intermediary transfer belt 720 at all times.

Figure 12:
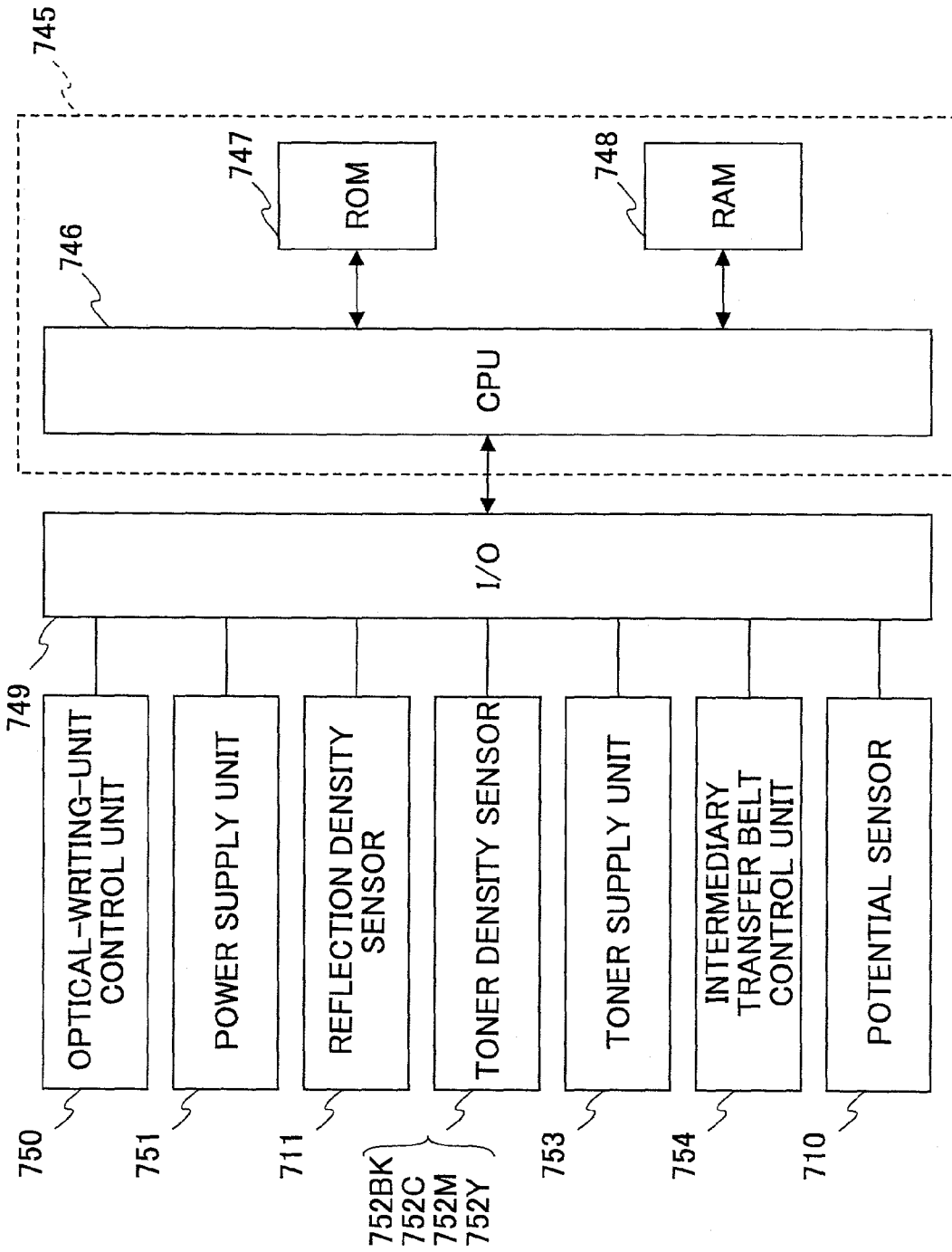
FIG. 12 is a block diagram of an electric circuit portion according to the second embodiment.

FIG. 12 is a block diagram of an electric circuit portion according to the second embodiment. The electric circuit portion includes a main control unit 745 and a plurality of peripheral control units. The main control unit 745 includes a main CPU 746, a ROM 747 having control programs and various data stored therein, and a RAM 748 serving as a work area to temporarily store various data therein. The main control unit 745 is connected via an I/O interface unit 749 to an optical-writing-unit control unit 750, a power supply unit 751, a reflection density sensor 711, a toner density sensors 752Bk, 752C, 752M, and 752Y, a toner supply unit 753, an intermediary transfer belt control unit 754, the potential sensor 710, etc. The I/O interface unit 749 is provided for the purpose of exchanging signals between the main control unit 745 and the peripheral control units.

The optical-writing-unit control unit 750 controls the optical writing unit 702 in accordance with instructions supplied from the main control unit 745 via the I/O interface unit 749. The power supply unit 751 applies a high potential to the charger 709 and the development bias to the development rollers 718Bk, 718C, 718M, and 718Y in accordance with instructions supplied from the main control unit 745 via the I/O interface unit 749.

The toner density sensors 752Bk, 752C, 752M, and 752Y are attached to the Bk development unit 703Bk, the C development unit 703C, the M development unit 703M, and the Y development unit 703Y, respectively, and detect the toner density of the respective two-component development agents. The toner supply unit 753 controls toner supply motors in the color-specific toner supply units in accordance with the instructions supplied from the main control unit 745 through the I/O interface unit 749, thereby controlling the supply of toners from the toner bottles 717Bk, 717C, 717M, and 717Y to the respective development units 703Bk, 703C, 703M, and 703Y.

The main control unit 745 supplies instructions to the toner supply unit 753 via the I/O interface unit 749 in response to the outputs of the toner density sensors 752Bk, 752C, 752M, and 752Y, such that the toner density of the two-component development agents are adjusted to a predetermined level inside the Bk development unit 703Bk, the C development unit 703C, the M development unit 703M, and the Y development unit 703Y. The intermediary transfer belt control unit 754 controls the drive motor for rotating the intermediary transfer belt 720 in accordance with the instructions supplied from the main control unit 745 through the I/O interface unit 749.

In what follows, a description will be given with regard to the detection of a development γ associated with each of the development units 703Bk, 703C, 703M, and 703Y. The development γ is detected at the time of a self-check before the apparatus becomes capable of forming images upon power-on, or is detected at the time of a self-check that is performed each time a fixed number of sheets are printed. For example, such detection is made when the temperature of the fixing unit 706 is less than 100° C. at the time of power-on, or is made during a self-check that is performed each time 100 sheets are printed.

Figure 13:
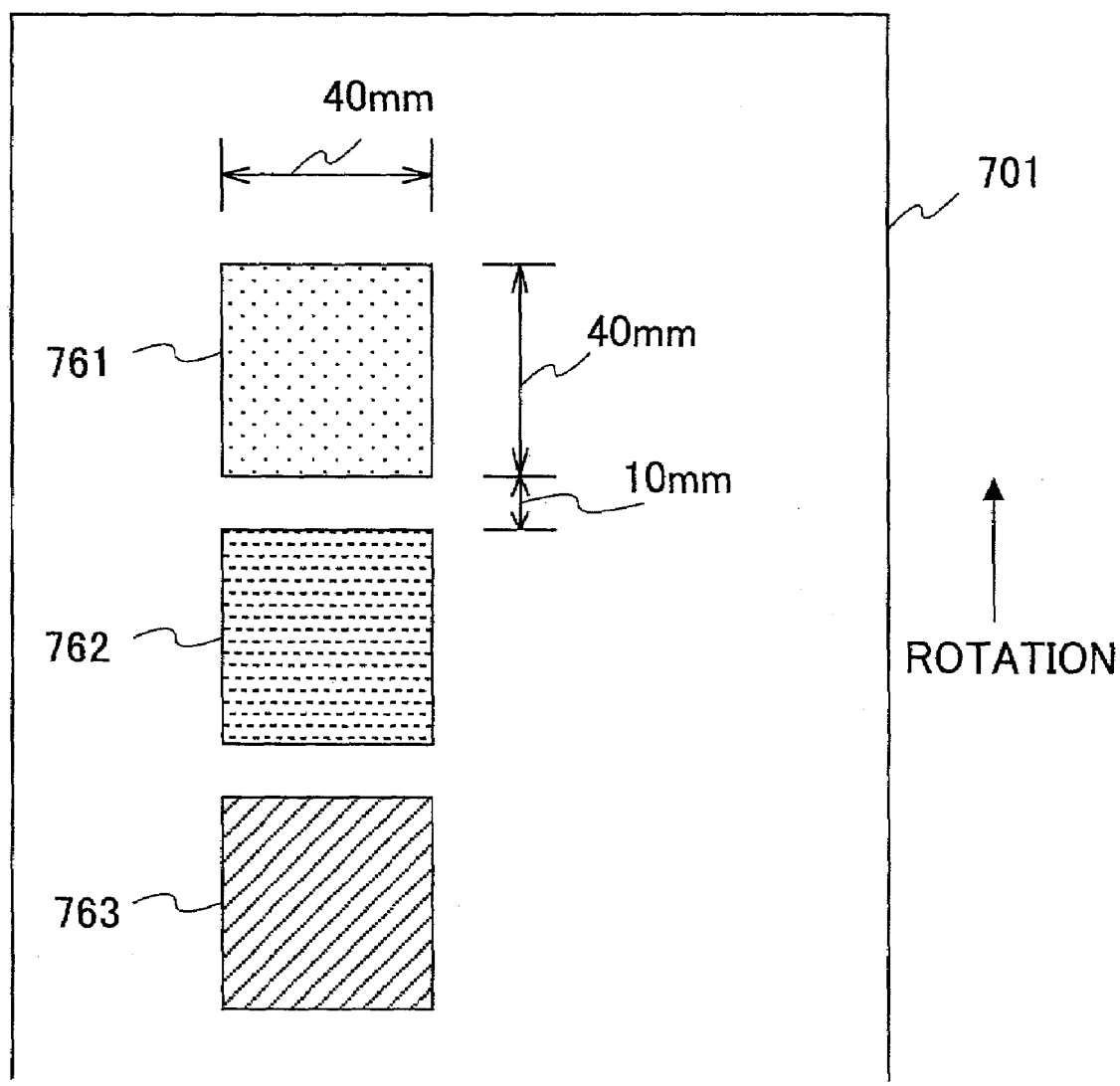
FIG. 13 is an illustrative drawing showing patch pattern latent images having varying densities.

The optical-writing-unit control unit 750 controls the optical writing unit 702 in accordance with the instructions supplied from the main control unit 745 through the I/O interface unit 749, thereby letting the optical writing unit 702 form patch patterns of four respective colors Bk, C, M, and Y-on the photosensitive body 701. These patch patterns are formed with varying densities such as 14 different densities (different tones). The photosensitive body 701 is uniformly charged by the charger 709, and the optical writing unit 702 forms patch patterns of four respective colors having varying densities. As shown in FIG. 13, patch pattern latent images 761, 762, 763, and so on having varying densities are generated in four different colors at predetermined intervals along the path corresponding to the rotation of the photosensitive body 701.

The main control unit 745 then reads the output data of the potential sensor 710 through the I/O interface unit 749 with respect to the patch pattern latent images 761, 762, 763, and so on that are printed in four colors on the photosensitive body 701, followed by storing the obtained data in the RAM 748. In this case, the main control unit 745 may not drive the optical writing unit 702, but may control the power supply unit 751 to control the development biases of the development units 703Bk, 703C, 703M, and 703Y, thereby forming the patch patterns of the four respective colors Bk, C, M, and Y with varying densities on the photosensitive body 701.

The patch pattern latent images 761, 762, 763, and so on printed on the photosensitive body 701 in four colors are developed by the development units 703Bk, 703C, 703M, and 703Y separately for each color, resulting in the visualized toner images of Bk, C, M, and Y colors. The main control unit 745 reads the outputs of the reflection density sensor 711 through the I/O interface unit 749 with respect to the patch pattern toner images of Bk, C, M, and Y colors. The obtained data are stored in the RAM 748 as Vpi (I=1 through 14) for each color.

The main control unit 745 then refers to a table stored in the ROM 747 by using the output data Vpi of the reflection density sensor 711 stored in the RAM 748, and a toner amount per unit area is obtained from the table. The toner amount obtained in this manner is stored in the RAM 748 as toner amount data.

Figure 14:
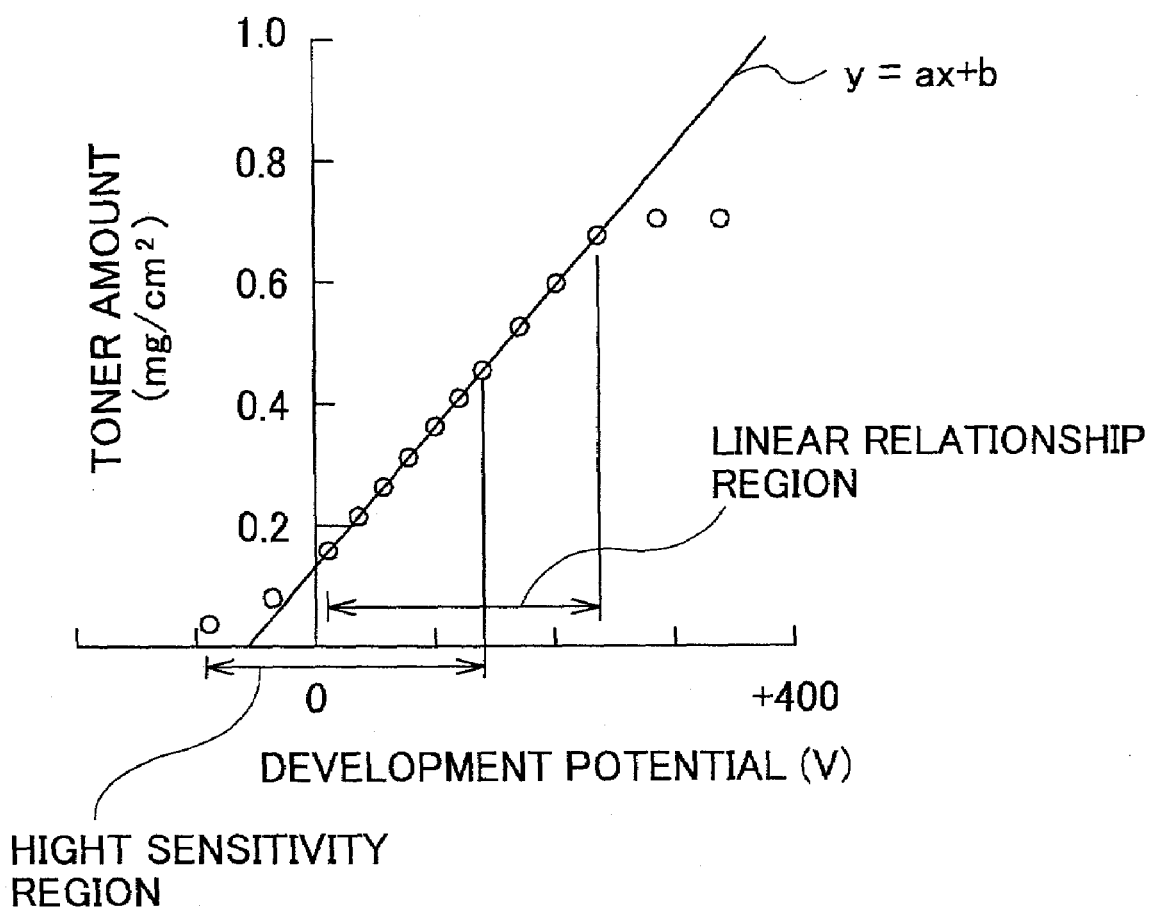
FIG. 14 is a chart showing the relationship between potential data and toner amount data stored in memory with respect to the patch patterns.

FIG. 14 is a chart showing the relationship between the potential data and the toner amount data stored in the RAM 748 with respect to the patch patterns. In FIG. 14, the horizontal axis represents a development potential (i.e., a difference between the surface potential of the photosensitive body 701 and the development bias potential used at the time of patch pattern generation), and the vertical axis represents the toner amount per unit area (mg/cm$^2$).

The main control unit 745 then analyzes the potential data and the toner amount data in the RAM 748, and identifies a color-specific range in which the toner data and the toner amount data have the linear relation with each other. After smoothing the data, the smoothed potential data and the smoothed toner amount data are subjected to the least-square-error method so as to obtain a linear approximation for development characteristics of the development units 703Bk, 703C, 703M, and 703Y. This produces a color-specific linear equation y=ax+b that represents the development characteristics of a corresponding one of the development units 703Bk, 703C, 703M, and 703Y. From the slope of this color-specific linear equation y=ax+b, the development γ of each of the development units 703Bk, 703C, 703M, and 703Y is obtained. In this manner, the main control unit 745 constitutes a development γ detecting means for detecting the development γ of each of the development units 703Bk, 703C, 703M, and 703Y.

Figure 11:
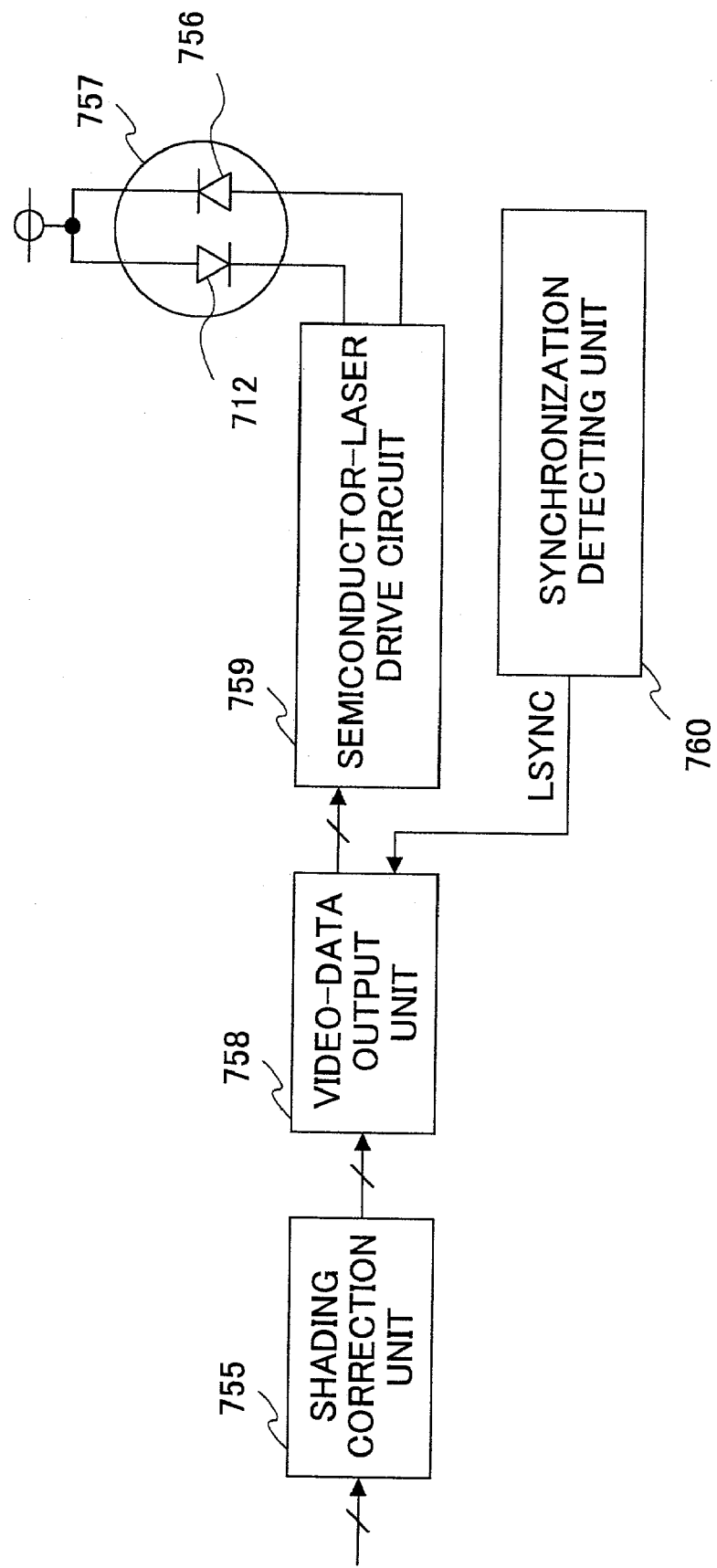
FIG. 11 is a block diagram showing a configuration of an optical writing unit.

FIG. 11 is a block diagram showing a configuration of the optical writing unit 702. A shading correction circuit 755 serving as a shading correction means applies color-specific write-shading correction to the multi-level-value image data supplied from the image processing unit by use of a color-specific correction table stored in the memory. That is, the laser power is progressively adjusted so as to achieve a constant writing power along the main scan path if the image data is the same.

The correction table described above may include a table as shown in FIG. 15. The table shown in FIG. 15 defines correction values of the writing laser power with respect to successive positions 1 through 9 on the main scan line. The correction values are used to correct the drive current of the semiconductor laser 712 of the optical writing unit 702. An entry "0.08", in FIG. 15, for example, means dropping the drive current of the semiconductor laser 712 by 8% relative to the level at the center position 5 of the main scan path. The shading correction circuit 755 selects a row of the correction table of FIG. 15 to attend to-correction for the positions 1 through 9 on the main scan path such that the writing laser power becomes constant along the main scan path. Such correction is performed separately for each color on the multi-level value image data supplied from the image processing unit.

The main control unit 745 instructs the optical-writing-unit control unit 750 via the I/O interface unit 749 to selects a row from the correction table on a color-specific manner in response to the level of the development γ as shown in FIG. 16. In response to this instruction from the main control unit 745, the optical-writing-unit control unit 750 orders the shading correction unit 755 to change rows of the correction table on a color-specific basis according to the development γ of the development units 703Bk, 703C, 703M, and 703Y. The change of rows of the correction table is made at the time of a self-check before the apparatus becomes capable of forming images upon power-on, or is made at the time of a self-check that is performed each time a fixed number of sheets are printed. For example, such change is made when the temperature of the fixing unit 706 is less than 100° C. at the time of power-on, or is made during a self-check that is performed each time 100 sheets are printed.

The optical writing unit 702 is provided with a semiconductor laser unit 757 including the semiconductor laser 712 and a photodiode 756. A synchronization detecting unit 760 detects a laser beam when it arrives from the polygon mirror 703 via a synchronizing mirror situated on the side where the main scan starts. The synchronization detecting unit 760 generates a line synchronizing signal in response to the detection. A video-data output unit 758 supplies the shading-corrected image data to a semiconductor-laser drive circuit 759 in synchronization with the line synchronizing signal supplied from the synchronization detecting unit 760. The semiconductor-laser drive circuit 759 drives the semiconductor laser 712 according to the image data supplied from the video-data output unit 758, thereby generating a laser beam modulated by the image data.

Figure 18:
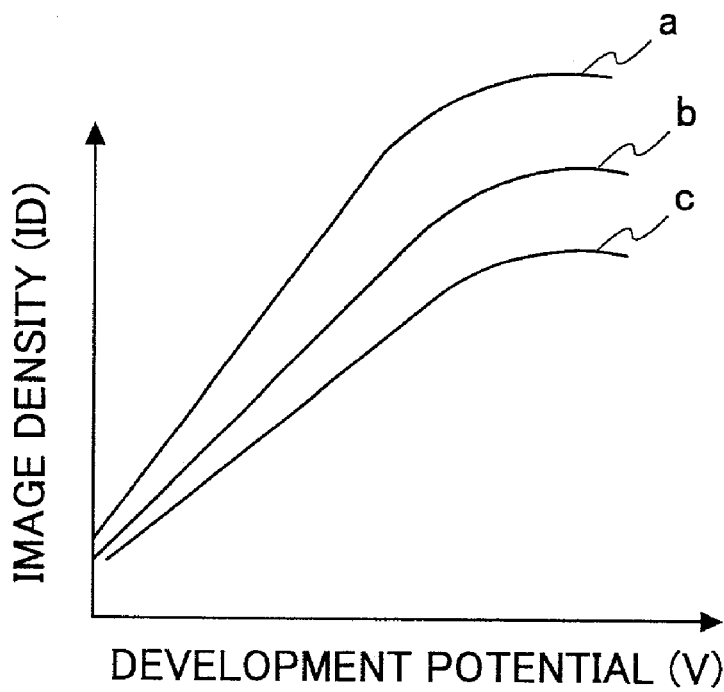
FIG. 18 is a chart showing the relationship between development potential and image density.

FIG. 18 is a chart showing the relationship between the development potential (i.e., the surface potential of the photosensitive body 701 minus the development bias potential of the development unit) and the image density. This relation changes as shown by characteristic curves a, b, and c when the development performance changes. In the second embodiment, the writing laser power is adjusted along the main scan path while changing the correction tables (i.e., the rows of the correction table) in response to the information (i.e, the development γ) obtained from the development characteristics of the development units. Since the laser beam power (shading) of the optical system of the optical writing unit 702 is corrected in this manner, image quality is improved.

According to the second embodiment, the image formation apparatus includes the optical writing unit 702 serving as a writing means to form images on the photosensitive body 701 by use of multi-level laser powers corresponding to the multi-level data values, the shading correction unit 755 serving as a shading correction means to adjust the writing laser power of the optical writing unit 702 along the main scan path, and the development units 703Bk, 703C, 703M, and 703Y serving as a development means to develop a latent image on the photosensitive body 701. Further, a development γ detection means (i.e., the potential sensor 710, the reflection density sensor 711, and the main control unit 745) is provided for the purpose of detecting the development γ of the development units, and a function (i.e., the main control unit 745 and the optical-writing-unit control unit 750) is provided to adjust the writing laser power of the shading correction unit 755 according to the development γ detected by the development γ detection means. With this provision, the writing laser power on the photosensitive body is adjusted to improve image quality.

According to the second embodiment, further, the shading correction circuit 755 is provided with a plurality of correction tables (i.e., a plurality of rows having respective entries in the correction table of FIG. 15) for the adjustment of writing laser power along the main scan path. A correction table selected from these correction tables is used to adjust the writing laser power, which eliminates the need for complex computation, thereby reducing the size of additional software.

Further, according to the second embodiment, the image formation apparatus generates a full-color image by using the optical writing unit 702 serving as a writing means and the development units 703Bk, 703C, 703M, and 703Y serving as a development means of respective colors. In addition, the development γ detection means is provided for the purpose of detecting the development γ of the development units 703Bk, 703C, 703M, and 703Y of the respective colors, and the writing laser power of the optical writing unit 702 is adjusted on a color-specific basis by the shading correction unit 755 based on the development γ detected by the development γ detection means. This achieves balanced hue from the center to the ends of a main scan path, thereby generating high-quality images having a proper gray balance.

According to the second embodiment, further, the development γ detection means includes the potential sensor 710 for detecting the potential of latent images on the photosensitive body 701, the optical sensor 711 for detecting the toner amount of toner images formed on the photosensitive body 701, and the main control unit 745 for obtaining the development γ from the output of the optical sensor 711. With this provision, the writing laser power on the photosensitive body is adjusted to improve image quality.

Figure 19:
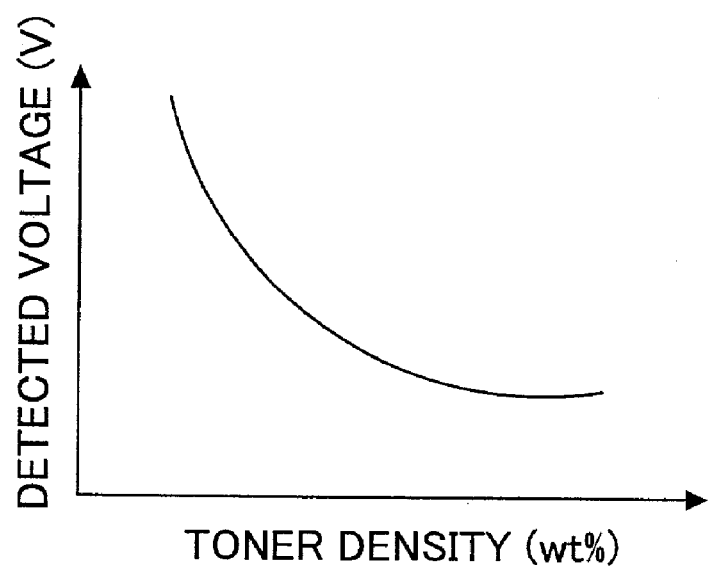
FIG. 19 is a chart showing output characteristics of toner density sensors.

In the following, a third embodiment of the present invention will be described. The third embodiment differs from the second embodiment in that the toner density sensors 752Bk, 752C, 752M, and 752Y are used as the development γ detection unit. FIG. 19 is a chart showing the output characteristics of the toner density sensors 752Bk, 752C, 752M, and 752Y.

The main control unit 745 instructs the optical-writing-unit-control unit 750 via the I/O interface unit 749 to selects a row from the correction table of FIG. 15 on a color-specific manner in response to the output level of the toner density sensors 752Bk, 752C, 752M, and 752Y as shown in FIG. 17. In response to this instruction from the main control unit 745, the optical-writing-unit control unit 750 orders the shading correction unit 755 to change rows of the correction table on a color-specific basis according to the output levels of the toner density sensors 752Bk, 752C, 752M, and 752Y.

According to the third embodiment described above, the development units 703Bk, 703C, 703M, and 703Y employ the respective two-component development agents for the development purpose, and the toner density sensors 752Bk, 752C, 752M, and 752Y are used as the development γ detection unit to detect the toner density of the two-component development agent in the respective development units 703Bk, 703C, 703M, and 703Y. With this provision, the writing laser power on the photosensitive body is adjusted to improve image quality.

Further, the present invention is not limited to these embodiments, but various variations and modifications may be made without departing from the scope of the present invention.

The present application is based on Japanese priority application No. 2001-122245 filed on Apr. 20, 2001, with the Japanese Patent Office, the entire contents of which are hereby incorporated by reference.

What is claimed is:

1. An apparatus for forming an image, comprising:
   a photosensitive body;
   an optical write unit which scans a light beam along a main scan path on a photosensitive body to create a latent image thereon, said light beam having power levels corresponding to multi-level image data;
   a shading correction unit which corrects shading along said main scan path by making adjustment to the multi-level image data along said main scan path, and changes said adjustment on a condition-specific basis; and an image processing unit which processes the multi-level image data, and switches dither patterns in processing the multi-level image data, wherein said shading correction unit changes said adjustment depending on which dither pattern is being used.

2. The apparatus as claimed in claim 1, further comprising a mode selection unit which selects an image-type mode, wherein said image processing unit uses a dither pattern corresponding to the selected image-type mode.

3. An apparatus for forming an image, comprising:
a photosensitive body;
an optical write unit which scans a light beam along a main scan path on a photosensitive body to create a latent image thereon, said light beam having power levels corresponding to multi-level image data;
a shading correction unit which corrects shading along said main scan path by making adjustment to the multi-level image data along said main scan path, and changes said adjustment on a condition-specific basis; and
a development $\gamma$ detection unit which detects a $\gamma$ characteristic of a process that develops said latent image on said photosensitive body, wherein said shading correction unit changes said adjustment depending on the $\gamma$ characteristic detected by the development $\gamma$ detection unit.

4. The apparatus as claimed in claim 3, wherein said shading correction unit is provided with a plurality of different tables each indicating different degrees of said adjustment that should be made along the main scan path, and selects one of the tables in response to the $\gamma$ characteristic detected by the development $\gamma$ detection unit.

5. The apparatus as claimed in claim 3, wherein said optical write unit creates said latent image for different colors, and said development $\gamma$ detection unit detects the $\gamma$ characteristic for each one of said different colors on a color-specific basis, and wherein said shading correction unit changes said adjustment for each one of the different colors in response to the color-specific $\gamma$ characteristic detected by the development $\gamma$ detection unit.

6. The apparatus as claimed in claim 3, wherein said development $\gamma$ detection unit includes:
a potential sensor which detects a potential of the latent image on said photosensitive body;
an optical sensor which detects a toner amount of a toner image formed from the latent image on said photosensitive body; and
a unit which obtains the $\gamma$ characteristic as a relationship between the potential of the latent image and the toner amount of the toner image.

7. The apparatus as claimed in claim 3, wherein said development $\gamma$ detection unit detects a toner density of a development agent as said $\gamma$ characteristic.

8. The apparatus as claimed in claim 3, wherein said development agent includes toner and a ferrite carrier as components thereof.

9. The apparatus as claimed in claim 3, wherein said development $\gamma$ detection unit detects the $\gamma$ characteristic at a time of power-on of said apparatus.

10. The apparatus as claimed in claim 3, further includes a unit which forms a toner image from the latent image on said photosensitive body, and prints the toner image on a paper sheet, wherein said development $\gamma$ detection unit detects the $\gamma$ characteristic each time a predetermined number of sheets are printed by said apparatus.

* * * * *